Dec. 30, 1958 G. NEMETH 2,866,662
CLAMP HOLDER AND CLAMP FOR PIPE PUSHERS
Filed May 8, 1953
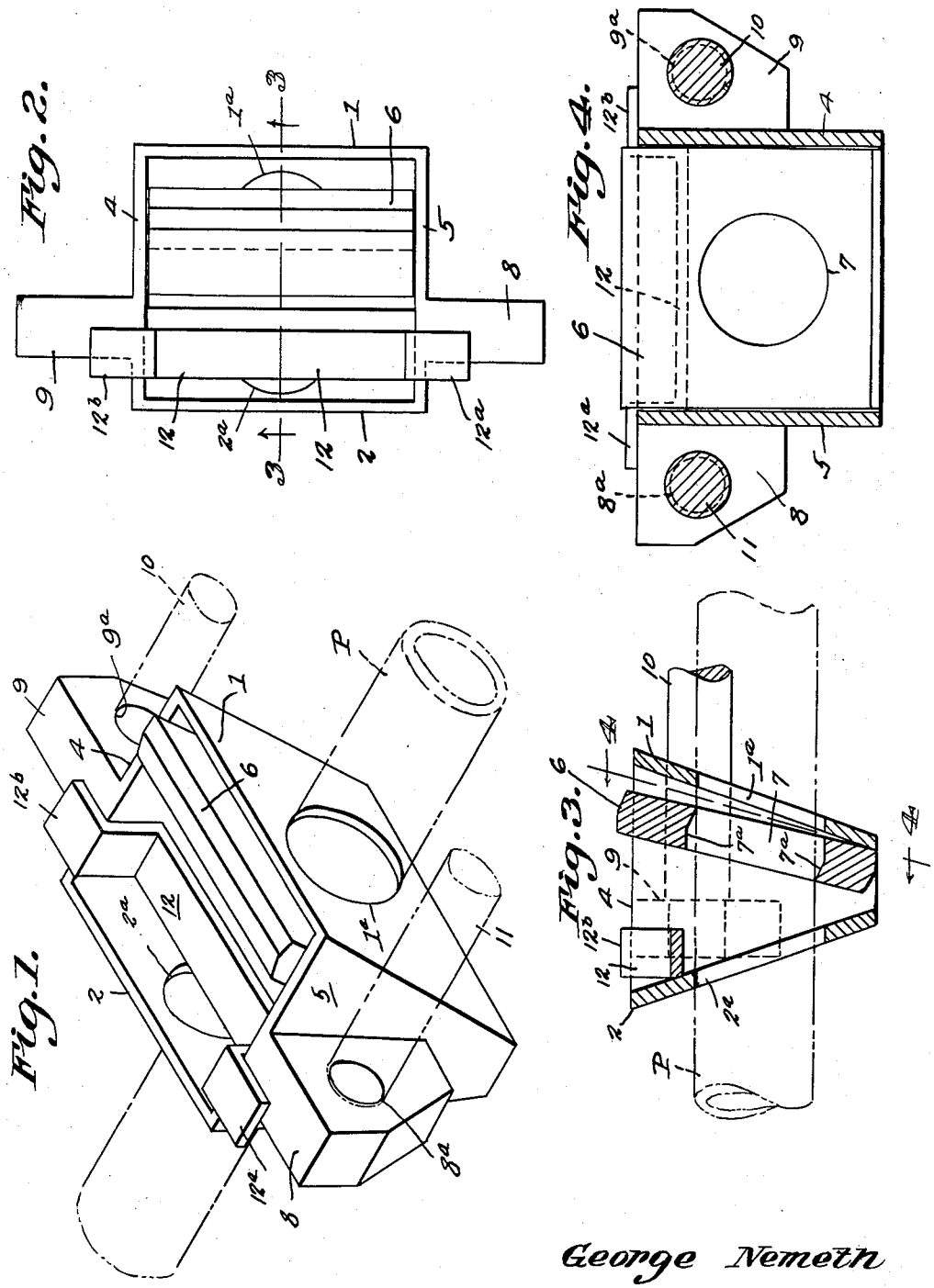
George Nemeth
INVENTOR
BY CA Snow &Co.
ATTORNEYS.

2,866,662

CLAMP HOLDER AND CLAMP FOR
PIPE PUSHERS

George Nemeth, Lorain, Ohio

Application May 8, 1953, Serial No. 353,713

1 Claim. (Cl. 294—92)

This invention relates to a pipe clamp and pipe clamp holder for use in advancing pipe sections underground or for withdrawing or removing pipe sections from an underground horizontal location. This device is particularly useful in forcing sections of pipe through the earth as when it is desired to provide a water connection from an underground water main or line located at or adjacent the curb to a furnace or other domestic outlet located within a basement or below ground level.

One of the objects of the invention is to provide a rugged and dependable tool for the purpose described which is operable by suitable hydraulic or other power operated mechanism to either insert pipe underground in a horizontal direction or to remove connected horizontal sections of pipe which have already been laid underground.

Another object of the invention is to provide an improved tool for the purpose described and which is rugged in construction and well adapted to stand the wear to which it is subjected in normal operation.

Further and more limited objects of my invention will appear as the description proceeds and by reference to the accompanying drawings in which similar parts are designated by corresponding reference characters.

In the accompanying drawings:

Fig. 1 is a perspective view of my improved tool.

Fig. 2 is a top plan view of the same tool.

Fig. 3 is a vertical sectional view on the line 3—3 of Fig. 2 and

Fig. 4 is a vertical sectional view on the line 4—4 of Fig. 3.

Referring now to the drawings in detail my improved tool comprises a pipe engaging clamp holder which is preferably formed of cast steel or the like and which comprises oppositely disposed side walls 1 and 2 which converge downwardly and are connected by end walls 4 and 5. The pipe engaging clamp holder is open at its bottom and positioned therewithin is a pipe engaging clamp block 6 which has a central opening 7 therein the inner edges of which are slightly grooved or V-shaped as indicated at 7a. The wall 2 has a circular opening 2a therein and the wall 1 has a similar opening 1a therein through which is received a pipe P. The walls 1 and 2 are preferably integral with the end walls 4 and 5 and the die holder is preferably cast in one piece. The end walls 4 and 5 have cast integral therewith a pair of outwardly extending ears or extensions 8 and 9 in which are formed circular recesses 8a and 9a therethrough the purpose of which will later appear. Fitting within the recesses 8a and 9a are a pair of rods or bars indicated by the reference characters 10 and 11 which are adapted to be reciprocated by suitable power operated mechanism (not shown). The pipe engaging clamp holder receives the pipe P therethrough and is reciprocated or oscillated by any suitable power means which imparts short strokes thereto in a direction axially of the pipe P. Carried by the die holder and loosely resting thereon is a U-shaped member 12 which has ears 12a and 12b which overlie the end walls 4 and 5 as shown most clearly in Figs. 1 and 2. The purpose and function of this member 12 is to limit the movement of the pipe engaging clamp 6. This member has circular recess therein the walls of which overlie and rest on the pipe section.

When it is desired to advance a section of pipe horizontally underground, the section of pipe is inserted through the die and pipe engaging clamp holder as will appear from Fig. 1. The holder 1 is then oscillated or reciprocated and the pipe engaging clamp 6 is actuated to advance the pipe section horizontally in the direction of its length. The pipe engaging clamp 6 moves axially of its length as it is being reciprocated and the edges 7a of the openings therein engage the outer surface of the pipe to progressively advance the same horizontally in a step by step motion.

The device may be operated in the reverse direction simply by removing the member 12 and placing it on the opposite side of the pipe engaging clamp holder so that a reverse motion is obtained. It should be pointed out that rapid and short reciprocations are imparted to the pipe engaging clamp holder in a direction axially of the pipe section in either direction to advance or withdraw the same.

It will now be clear that I have provided a pipe engaging clamp and pipe engaging clamp holder for a pipe pusher which will accomplish the objects of the invention as hereinbefore stated. The embodiment of the invention as herein disclosed is to be considered merely illustrative and not in a limiting sense as various changes may be made in the details of construction and arrangement of parts without departing from the spirit of my invention. The invention is therefore limited only in accordance with the scope of the appended claim.

What is claimed is:

A device for horizontally moving a pipe in the ground comprising a substantially flat clamping plate having a circular opening therethrough, the wall of said opening converging inwardly from opposite sides of said plate and diverging outwardly from the rims of the opening whereby to provide oppositely disposed pipe biting edges, a holder for said plate comprising downwardly convergent flat front and rear walls, said walls having aligned openings through which the pipe is adapted to loosely engage, end walls secured between said front and rear walls, apertured blocks extending oppositely from each end wall, a U-shaped plate stop member engaging between said end walls, and outwardly extending ears carried by said U-shaped member engaging over the upper edges of said end walls, said U-shaped member being insertable between said end walls on a selected side of said plate to limit the rocking movement of said plate.

References Cited in the file of this patent

UNITED STATES PATENTS

| | | |
|---|---|---|
| 231,843 | Onderdenk | Aug. 31, 1880 |
| 275,183 | Finney | Apr. 3, 1883 |
| 556,587 | Noack | Mar. 17, 1896 |
| 730,580 | Stanford | June 9, 1903 |
| 1,330,298 | Baird | Feb. 10, 1920 |
| 2,183,772 | Johnson | Dec. 19, 1939 |
| 2,189,981 | Gunn | Feb. 13, 1940 |
| 2,687,281 | Fehlmann | Aug. 24, 1954 |

FOREIGN PATENTS

| | | |
|---|---|---|
| 422,893 | Italy | June 27, 1947 |